United States Patent
Lin

(10) Patent No.: US 7,821,593 B2
(45) Date of Patent: Oct. 26, 2010

(54) BLACKLIGHT MODULE AND LIQUID CRYSTAL DISPLAY

(75) Inventor: Han-Ping Lin, Tainan County (TW)

(73) Assignee: Chimei Innolux Corporation, Chu-Nan Miao-Li County (TW)

( * ) Notice: Subject to any disclaimer, the term of this patent is extended or adjusted under 35 U.S.C. 154(b) by 196 days.

(21) Appl. No.: 12/142,741

(22) Filed: Jun. 19, 2008

(65) Prior Publication Data

US 2008/0316390 A1   Dec. 25, 2008

(30) Foreign Application Priority Data

Jun. 21, 2007   (TW) ............................... 96122300 A

(51) Int. Cl.
*G02F 1/1333* (2006.01)

(52) U.S. Cl. .............................. 349/58; 349/61; 349/67; 362/225

(58) Field of Classification Search ......... 362/632–634, 362/225; 349/58, 67
See application file for complete search history.

(56) References Cited

U.S. PATENT DOCUMENTS 7,246,934 B2 *   7/2007   Jeong ........................... 362/632
7,452,102 B2 *   11/2008   Ryu ............................. 362/225

* cited by examiner

*Primary Examiner*—Richard H Kim
(74) *Attorney, Agent, or Firm*—Chun-Ming Shih

(57) ABSTRACT

A backlight module includes a frame, a lamp stationary barrier, and at least one lamp. The lamp stationary barrier has at least one side wall formed by oblique lines. The lamp is disposed in the frame, and at least a portion of an electrode end of the lamp is covered by the side wall. The oblique side wall may effectively improve the luminance uniformity of the backlight module, and thus a liquid crystal display using this backlight module has good display quality.

20 Claims, 4 Drawing Sheets

BLACKLIGHT MODULE AND LIQUID CRYSTAL DISPLAY

BACKGROUND OF THE INVENTION

1. Field of the Invention

The present invention generally relates to a liquid crystal display (LCD), in particular, to an LCD and a backlight module thereof.

2. Description of Related Art

An LCD mainly includes a liquid crystal panel and a backlight module. The liquid crystal panel is used for displaying image, and the backlight module is used for providing enough brightness for the liquid crystal panel to display image. Therefore, the luminance provided by the backlight module and the luminance uniformity thereof will influence the display quality of the LCD.

FIG. 1 shows a conventional backlight module and a luminance distribution diagram thereof. In the figure, the luminance of the backlight module is distributed along an axial direction of the lamp. Referring to FIG. 1, the backlight module 100 includes a frame 110 and a plurality of lamps 120 disposed in the frame 110. The lamps 120 are arranged in parallel with regular intervals in the frame 110, so as to form a surface light source with uniform luminance. As shown in FIG. 1, two ends of the lamps 120 are electrode ends, and the tube walls at the electrode ends of the lamps 120 are not coated with phosphor powders uniformly. Therefore, in the backlight module 100, areas at the two ends of the lamps 120 may have apparently lower luminance. Even worse, dark areas may be generated on an LCD using the conventional backlight module 100, which severely influences the display quality of the LCD.

SUMMARY OF THE INVENTION

Accordingly, the present invention is directed to a backlight module with uniform luminance.

The present invention is also directed to an LCD with good display quality.

The present invention provides a backlight module including a frame, a lamp stationary barrier, and at least one lamp. The lamp stationary barrier is disposed on a base plate of the frame and has at least one side wall. The side wall is formed by oblique lines, a first angle is formed between the oblique line adjacent to the base plate and the base plate, and a second angle is formed between every two adjacent oblique lines. The lamp is disposed in the frame, and at least a portion of an electrode end of the lamp is covered by the side wall.

In an embodiment of the present invention, lengths of the oblique lines are not all the same.

In an embodiment of the present invention, the first angle is in a range of 90° to 180°.

In an embodiment of the present invention, the second angle is in a range of 90° to 180°.

In an embodiment of the present invention, the second angles are not all the same.

In an embodiment of the present invention, a material of the frame includes metal.

In an embodiment of the present invention, the backlight module further includes a reflector disposed between the base plate and the lamp.

In an embodiment of the present invention, the backlight module further includes a reflective layer disposed on an inner surface of the base plate and the lamp stationary barrier facing the lamp.

In an embodiment of the present invention, a material of the reflective layer includes metal or polymer.

The present invention further provides an LCD which includes a liquid crystal panel and an above-mentioned backlight module. The backlight module is disposed beneath the liquid crystal panel.

In an embodiment of the present invention, the backlight module further includes an optical film disposed between the backlight module and the liquid crystal panel.

In an embodiment of the present invention, the optical film is a brightness enhancement film, a prism sheet, or a diffuser.

The present invention further provides a backlight module which includes a frame, a lamp stationary barrier, and at least one lamp. The lamp stationary barrier is disposed on a base plate of the frame, and has at least one curved side wall. The lamp is disposed in the frame, and at least a portion of an electrode end of the lamp is covered by the curved side wall.

In an embodiment of the present invention, a material of the frame includes metal.

In an embodiment of the present invention, the backlight module further includes a reflector disposed between the base plate and the lamp.

In an embodiment of the present invention, the backlight module further includes a reflective layer disposed on an inner surface of the base plate and the lamp stationary barrier facing the lamp.

In an embodiment of the present invention, a material of the reflective layer includes metal or polymer.

The present invention further provides an LCD which includes a liquid crystal panel and an above-mentioned backlight module. The backlight module is disposed beneath the liquid crystal panel.

In an embodiment of the present invention, the backlight module further includes an optical film disposed between the backlight module and the liquid crystal panel.

In an embodiment of the present invention, the optical film is a brightness enhancement film, a prism sheet, or a diffuser.

In the backlight module of the present invention, the side wall of the lamp stationary barrier in contact with the lamp is formed by oblique lines or a curve line. The side wall may reflect light from other areas in the backlight module to a light-emitting surface above the electrode end of the lamp to output the light. Therefore, the luminance uniformity of the backlight module is improved, and the LCD using the backlight module may achieve to have good display quality.

In order to make the aforementioned and other objectives, features, and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
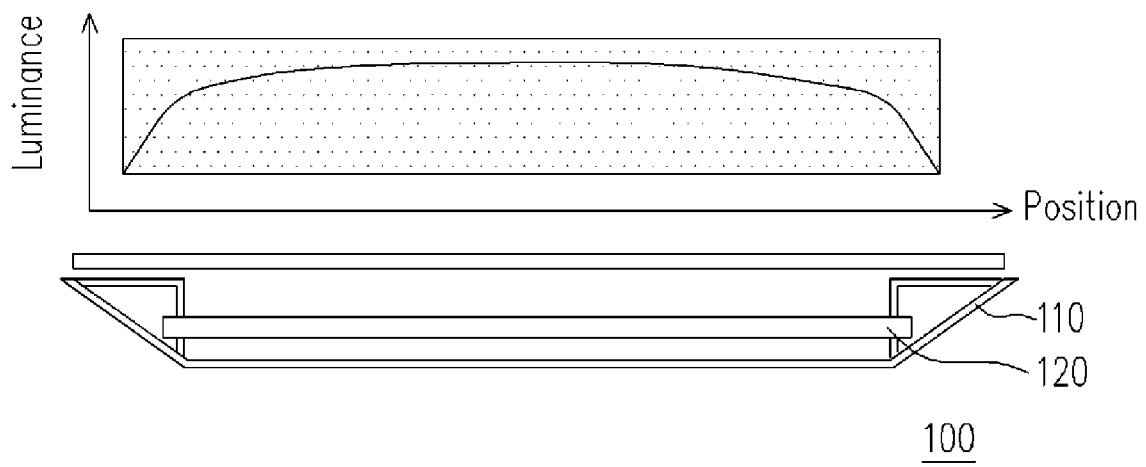
FIG. 1 shows a conventional backlight module and a luminance distribution diagram thereof.

Reference will now be made in detail to the present embodiments of the invention, examples of which are illustrated in the accompanying drawings. Wherever possible, the same reference numbers are used in the drawings and the description to refer to the same or like parts.

The First Embodiment

Figure 2A:
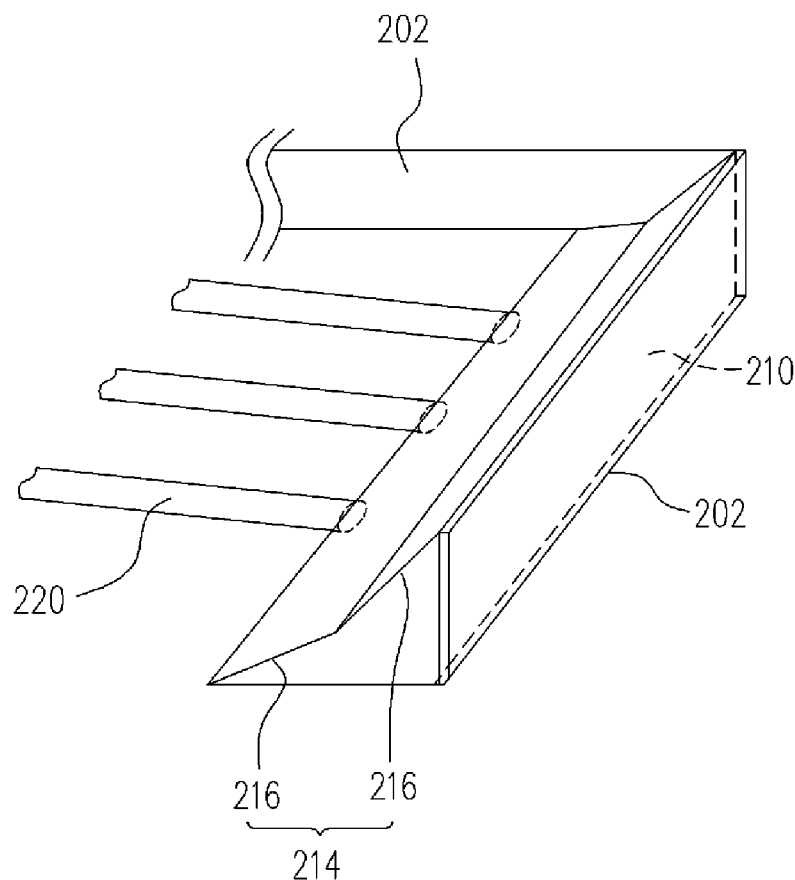
FIG. 2A is a schematic view of a backlight module according to a first embodiment of the present invention.
Figure 2B:
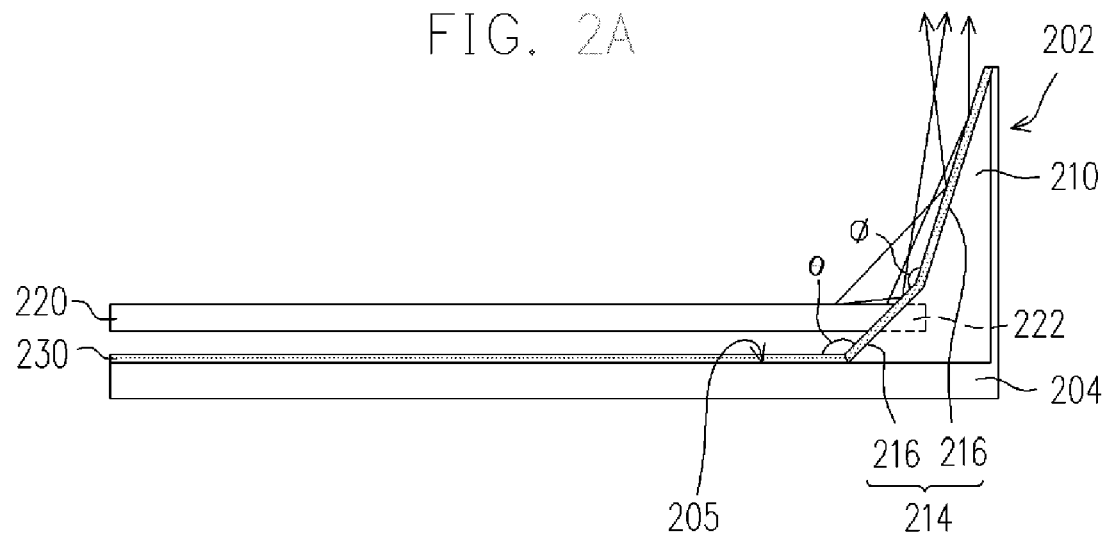
FIG. 2B is a cross-sectional view of FIG. 2A.

FIG. 2A is a schematic three-dimensional view of a backlight module according to a first embodiment of the present invention, and FIG. 2B is a cross-sectional view of FIG. 2A. Referring to FIGS. 2A and 2B together, the backlight module 200 includes a frame 202, a lamp stationary barrier 210, and at least one lamp 220. The lamp stationary barrier 210 and the lamp 220 are both disposed in the frame 202, and located on the base plate 204 of the frame 202. The lamp stationary barrier 210 is used to support the lamp 220. In detail, the lamp 220 may be a cold cathode fluorescence lamp (CCFL), and at least one electrode end 222 of the lamp 220 correspondingly contacts the side wall 214 of the lamp stationary barrier 210. Referring to FIGS. 2A and 2B again, at least a portion of the electrode end 222 is covered by the side wall 214. Further, the lamp 220 is in a straight- or U-shape.

Accordingly, a material of the frame 202 is preferably metal. In addition, the frame 202 made of metal may also reflect light from the lamp 220, such that the backlight module 200 has a better light source utilization. Or, in order to reduce the weight of the backlight module 200, the frame 202 may be made of plastic. In order to enable the frame 202 made of plastic to reflect light, a reflective material, such as lead paint, may be added in the plastic during the fabrication of the frame 202.

The lamp stationary barrier 210 has at least one side wall 214 formed by oblique lines 216, and lengths of the oblique lines 216 are not all the same. In other words, the lengths of the oblique lines 216 may be totally the same, totally different, or partially the same.

It should be noted that an angle $\theta$ is formed between the oblique line 216 adjacent to the base plate 204 and the base plate 204, and an angle $\phi$ is formed between every two adjacent oblique lines 216, where $90° < \theta$, $\phi < 180°$, and the angle $\theta$ is different from the angle $\phi$.

Referring to FIG. 2B, when the lamp 220 emits light, part of the light is directly projected out of the backlight module 200 from a light-emitting surface. The rest of the light is first projected on the frame 202, and then reflected out of the backlight module 200 by the frame 202.

In detail, the light projected on the base plate 204 is partially reflected to the side wall 214, and partially directly reflected out of the backlight module 200. Part of the light projected on the side wall 214 is reflected out of the backlight module 200, and the rest is first reflected to the base plate 204 and then reflected out of the backlight module 200 by the base plate 204.

Particularly, the side wall 214 formed by at least two oblique lines 216 may guide the light from other areas in the backlight module 200 to come out from the electrode end 222 of the lamp 220. Compared with the conventional art, the light output from the electrode end 222 of the lamp 220 is increased. Therefore, the brightness at the electrode end 222 of the lamp 220 is effectively improved. In other words, the luminance uniformity of the backlight module 200 will be enhanced accordingly.

In order to make the content and effect of the present invention more comprehensible, simulation results are listed in the following tables. Table 1 shows luminance simulation results of a conventional backlight module, in which the side wall of the conventional backlight module only has one oblique line. Table 2 shows luminance simulation results of a backlight module in this embodiment, in which the side wall of the backlight module in this embodiment has two oblique lines. The three values in each column respectively represent luminance of three lamps 220 arranged longitudinally in the backlight module 200. The three values in each row from left to right respectively represent luminance of the lamps 220 from their central portions to electrode end 222.

TABLE 1

| The side wall is formed by one oblique line, and $\theta = 105°$ | | | | |
|---|---|---|---|---|
| 325.1 | 355.9 | 288.3 | MAX | 362.6 |
| 311.6 | 334.1 | 291.3 | min | 288.3 |
| 326.6 | 362.6 | 293.5 | Luminance ratio | 1.26 |

TABLE 2

| The side wall is formed by two oblique lines, and $\theta = 127.5°$, $\phi = 150°$ | | | | |
|---|---|---|---|---|
| 320.6 | 354.5 | 291.3 | MAX | 358.9 |
| 317.6 | 337.8 | 294.3 | min | 291.3 |
| 324.3 | 358.9 | 295.8 | Luminance ratio | 1.23 |

The luminance ratio of the backlight module is preferably 1. That is, the brightness of the backlight module must be consistent, without much difference in brightness. Thus, the LCD using the backlight module may have good display quality.

From Tables 1 and 2, it shows that when the side wall 214 only has one oblique line 216, and the angle $\theta$ formed between the oblique line 216 and the base plate 204 is 105°, the luminance ratio (maximum luminance/minimum luminance) is 1.26.

However, when the side wall 214 has two oblique lines 216, and $\theta=127.5°$, $\phi=150°$, the luminance ratio of the backlight module 200 is 1.23. Thus, the side wall 214 formed by two oblique lines 216 can effectively improve the brightness of the area at the electrode end 222 of the lamp 220, thereby reducing the luminance ratio. That is, the output light distribution of the backlight module 200 is more uniform, and the luminance uniformity is greatly improved.

Based on the above, the side wall formed by two oblique lines can effectively improve the luminance uniformity of the backlight module.

Further, in this embodiment, the two oblique lines 216 having different lengths are described by way of example. Those of ordinary skilled persons in the art may conceivably design the two oblique lines into several oblique lines, and the lengths of the oblique lines are totally the same, totally different, or partially the same, thereby effectively improving the luminance uniformity of the backlight module. It can be deduced from the above simulation results that if the side wall has more oblique lines, the uniform luminance of the backlight module will be improved more effectively.

In addition, in this embodiment, the angle $\theta$ is different from the angle $\phi$. Those of ordinary skilled persons in the art may adjust the angles $\theta$ and $\phi$ to be the same according to the practical requirements of the backlight module. Particularly, with respect to the side wall formed by several oblique lines, the angles φ formed between every two adjacent oblique lines may be totally the same, different, or partially the same according to the design requirements.

In order to make the backlight module 200 have a good light source utilization, the backlight module 200 further includes a reflective layer 230 disposed on an inner surface 205 of the base plate 204 to face the lamp 220 and overlapped on the oblique line 216. The reflective layer 230 is made of a metal or a highly-reflective polymer material, so as to effectively reflect the light emitted by the lamp 220. Or, a reflector (not shown) may be disposed between the base plate 204 and the lamp 220, so as to make the backlight module 200 have a good light source utilization.

Figure 3:
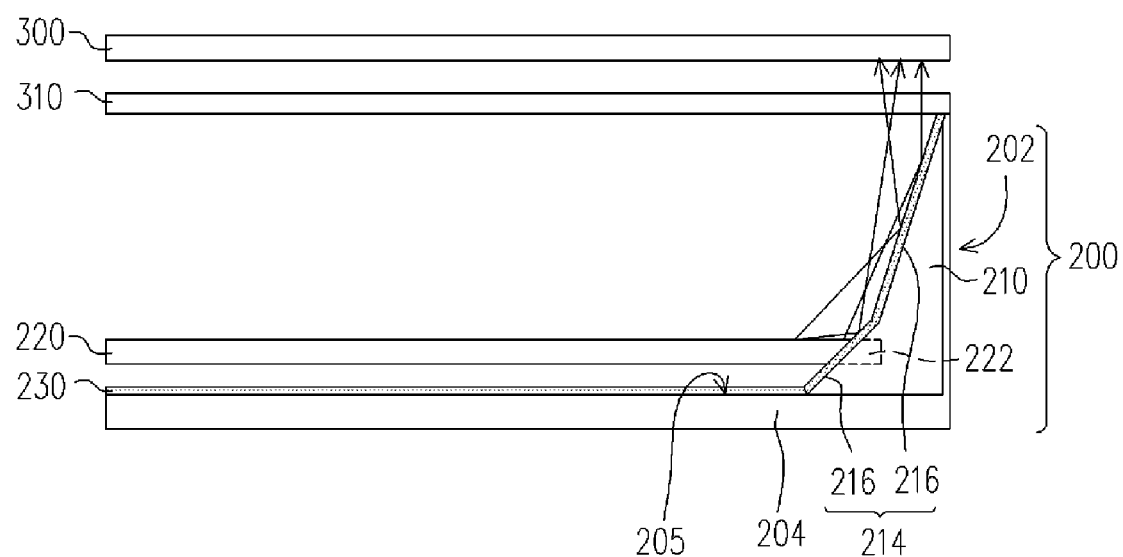
FIG. 3 is a schematic view of an LCD using the backlight module of this embodiment.

FIG. 3 is a schematic view of an LCD using the backlight module of this embodiment. Referring to FIG. 3, the backlight module 200 is assembled with a liquid crystal panel 300, and the backlight module 200 is disposed beneath the liquid crystal panel 300, thus forming an LCD 350. The backlight module 200 can provide light with uniform luminance to the liquid crystal panel 300, and thus the LCD 350 has good display quality.

Further, in order to make the LCD 350 have better display quality, an optical film 310 may be further disposed between the backlight module 200 and the liquid crystal panel 300. The optical film 310 may be a brightness enhancement film for enhancing the brightness of the light, a diffuser for improving the light utilization, or a prism sheet for adjusting the direction of the light.

The Second Embodiment

Figure 4:
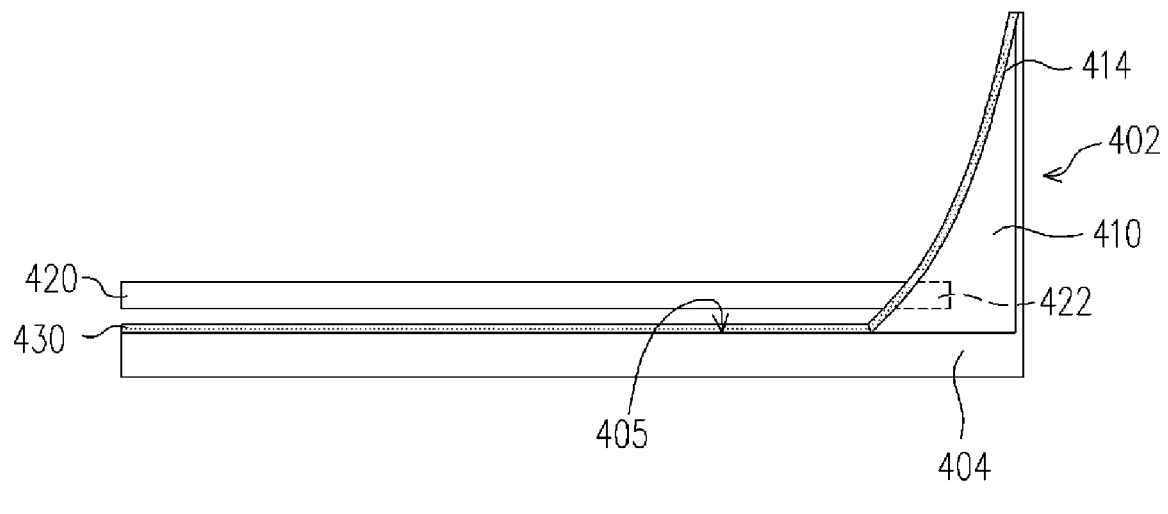
FIG. 4 is a schematic view of a backlight module according to a second embodiment of the present invention.

FIG. 4 is a schematic view of a backlight module according to a second embodiment of the present invention. Referring to FIGS. 2 and 4 together, this embodiment is substantially similar to the first embodiment, and the same or like symbols appearing in the figures represent same or like elements. The same details will not be described and only the differences therebetween will be illustrated hereinafter.

Referring to FIG. 4, the backlight module 400 includes a frame 402, a lamp stationary barrier 410, and at least one lamp 420 disposed in the frame 402. The lamp stationary barrier 410 has at least one curved side wall 414. An electrode end 422 of the lamp 420 correspondingly contacts the curved side wall 414. Apparently, at least a portion of the electrode end 422 is covered by the curved side wall 414.

The curved side wall 414 achieves the same function as the side wall 214 formed by the oblique lines 216 in the first embodiment. The curved side wall 414 may guide the light from other areas in the backlight module 400 to come out from above the electrode end 422 of the lamp 420. Thus, the luminance uniformity of the backlight module 400 is enhanced.

Likewise, a reflective layer 430 may be disposed on an inner surface 405 of the frame 402 to face the lamp 420, and the reflective layer 430 extends to the curved side wall 414. Or, a reflector (not shown) may be disposed between the base plate 404 of the frame 402 and the lamp 420, so as to improve the light source utilization of the backlight module 400.

Therefore, the backlight module 400 with good luminance uniformity is assembled with a liquid crystal panel (not shown) to form the LCD, and the LCD has a good display effect. As the configuration of the LCD formed by the assembly of the backlight module 400 and the liquid crystal panel has already been illustrated in the first embodiment of FIG. 3, so the details will not be described with the drawings again.

In view of the above, in the LCD and the backlight module thereof provided by the present invention, the side wall formed by oblique lines or a curve line may be used to guide the light from other areas in the backlight module to come out from the electrode end of the lamp. Therefore, the luminance uniformity of the backlight module is improved, and further the LCD using the backlight module has a good display effect.

It will be apparent to those skilled persons in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising:
    a frame;
    a lamp stationary barrier, disposed on a base plate of the frame, and comprising at least one side wall, wherein the side wall is formed by oblique lines, a first angle is formed between the oblique line adjacent to the base plate and the base plate, and a plurality of second angles each less than 180 degrees and formed between every two adjacent oblique lines; and
    at least one lamp, disposed in the frame, wherein at least a portion of an electrode end of the lamp is covered by the side wall.

2. The backlight module according to claim 1, wherein lengths of the oblique lines are not all the same.

3. The backlight module according to claim 1, wherein the second angles are not all the same.

4. The backlight module according to claim 1, further comprising a reflector disposed between the base plate and the lamp.

5. The backlight module according to claim 1, further comprising a reflective layer disposed on an inner surface of the base plate or on an inner surface of the lamp stationary barrier toward the lamp.

6. A liquid crystal display (LCD) device, comprising:
    a liquid crystal panel;
    a backlight module, disposed beneath the liquid crystal panel, comprising:
        a frame;
        a lamp stationary barrier, disposed on a base plate of the frame, and comprising at least one side wall, wherein the side wall is formed by oblique lines, a first angle is formed between the oblique line adjacent to the base plate and the base plate, and a plurality of second angles each less than 180 degrees and formed between every two adjacent oblique lines; and
        at least one lamp, disposed in the frame, wherein at least a portion of an electrode end of the lamp is covered by the side wall.

7. The LCD according to claim 6, wherein lengths of the oblique lines are not all the same.

8. The LCD according to claim 6, wherein the second angles are not all the same.

9. The LCD according to claim 6, wherein the backlight module further comprises a reflector disposed between the base plate and the lamp.

10. The LCD according to claim 6, wherein the backlight module further comprises a reflective layer disposed on an inner surface of the base plate or on an inner surface of the lamp stationary barrier toward the lamp.

11. The LCD according to claim 6, further comprising an optical film disposed between the backlight module and the liquid crystal panel.

12. The LCD according to claim 11, wherein the optical film is a brightness enhancement film, a prism sheet, or a diffuser.

13. A backlight module, comprising:
a frame;
a lamp stationary barrier, disposed on a base plate of the frame, and comprising at least one curved side wall curved in the concave direction; and
at least one lamp, disposed in the frame, wherein at least a portion of an electrode end of the lamp is covered by the side wall.

14. The backlight module according to claim 13, further comprising a reflector disposed between the base plate and the lamp.

15. The backlight module according to claim 13, further comprising a reflective layer disposed on an inner surface of the base plate or on an inner surface of the lamp stationary barrier toward the lamp.

16. A liquid crystal display (LCD) device, comprising:
a liquid crystal panel;
a backlight module, disposed beneath the liquid crystal panel, comprising:
a frame;
a lamp stationary barrier, disposed on a base plate of the frame, and comprising at least one curved side wall curved in the concave direction; and
at least one lamp, disposed in the frame, wherein at least a portion of an electrode end of the lamp is covered by the side wall.

17. The LCD according to claim 16, wherein the backlight module further comprises a reflector disposed between the base plate and the lamp.

18. The LCD according to claim 16, wherein the backlight module further comprises a reflective layer disposed on an inner surface of the base plate or on an inner surface of the lamp stationary barrier toward the lamp.

19. The LCD according to claim 16, further comprising an optical film disposed between the backlight module and the liquid crystal panel.

20. The LCD according to claim 16, wherein the optical film is a brightness enhancement film, a prism sheet, or a diffuser.

* * * * *